United States Patent Office 3,116,151
Patented Dec. 31, 1963

3,116,151
PROCESS FOR THE PRODUCTION OF READY-FOR-USE SOUPS AND SAUCES IN POWDERED FORM AND THE RESULTING PRODUCT
Claude Robert Giddey, Geneva, Switzerland, assignor to Koopmans Meelfabrieken N.V., Leeuwarden, Netherlands, a Dutch corporation
No Drawing. Filed May 18, 1961, Ser. No. 110,870
Claims priority, application Switzerland May 20, 1960
9 Claims. (Cl. 99—124)

The present invention relates to a process for the production of ready-for-use soups and sauces in powdered form, from which the ready-for-use dish can be prepared by immediate dispersion of the constituents in a hot or cold liquid.

Soups and sauces in powdered form are mixtures of various ingredients, among which may be mentioned different types of flour, solubilized starches, powdered or chopped vegetables, meat extracts, sugar, salt, fat, oil, species, etc. The products of this type now known and used are known to have the disadvantage that it is difficult to disperse them in hot or boiling water because they give rise to the formation of lumps, which can only be eliminated by careful rubbing or sifting. For this reason it is recommended by manufacturers of these products first to disperse the products in a small quantity of cold water, subsequently to add the mixture to hot or boiling water, and then to boil it for a more or less prolonged period. It will be evident that such a method of preparation does not meet present-day requirements, since there is now a marked tendency to use foodstuffs which are at once ready for consumption. Such products accordingly cannot be used in slot machines, in which they have to be distributed immediately in hot water, without being previously dispersed or subsequently boiled.

Experiments carried out by applicant have shown that the said disadvantage is due to the fact that some of the constituents of such products, in particular those which have to act as binders, will swell very rapidly in hot water, so that the particles will stick together before they get a chance to be dispersed in water. This accounts at the same time for the possibility of avoiding lump formation by dispersing the powder very gradually in hot water, with very thorough mixing. In order to prevent the formation of large agglomerates as the powdered product comes into contact with the hot liquid, binders are used which consist of less rapidly swelling constituents, which only reach the fully hydrated state after a more or less prolonged period, in view of which the product has to be boiled.

Various methods have been proposed for improving the dispersion of such products in hot water. A method according to which the particles that are capable of swelling are enveloped in a fatty substance makes it possible to retard the hydration of the particles and consequently to improve their dispersion, if the fatty substance used is one with a high melting point. Unfortunately, fatty substances with a high melting point are unacceptable from physiological and organoleptical point of view, so that they cannot be used in products of this kind. The granulation method, which is applied advantageously in order to improve the dispersion of the given products in a liquid, does not prevent the formation of lumps in hot water. This is due to the fact that the granules are too compact and the ratio between area and weight is too small for the area coming into contact with water to ensure rapid dispersion of the constituents present in the granules.

It is the object of the present invention to obviate the above mentioned disadvantages. The process according to the invention differs from the known methods in that the fatty constituents are caused to melt, upon which they are intimately mixed with all the insoluble constituents in such a way that a practically homogeneous paste is obtained, the paste then being allowed to harden and subsequently being converted into gratings, which are mixed with the soluble constituents.

According to this process therefore gratings are first prepared, which contain constituents capable of swelling, to which the formation of lumps is due, and fatty constituents, upon which they are mixed with the soluble constituents. The specific area of such gratings is very large, which favours a rapid dispersion of the constituents, according as the melting of the fatty constituents. The distance between the swelling constituents in a chip of gratings is so great that they are dispersed before a lump can be formed from the chip itself. The powdered soluble constituents, such as salt, glutamate, sugar, milk powder, etc., which in combination with the gratings form the final product, prevent mutual agglomeration of the chips of gratings and owing to their solubility permit very rapid moistening of the chips over their entire surface.

It is to be noted that, to facilitate the grating process, it is preferable to mould the paste into a cake before the hardening process. The cake can be formed by compression in an alternatively or a continuously operating press. In order to ensure favourable hardening, it is necessary to cool the cake at a temperature below 15° C. Finally, gratings obtained with the aid of graters having holes with a diameter between 1 mm. and 3 mm. produce the best results.

The process according to the invention may, for instance, be carried out as follows.

EXAMPLE I

*Cream of Tomato Soup*

The following mixture is started from:

95 g. of potato flour
25 g. of potato powder
145 g. of tomato powder

When the mixture is thoroughly homogeneous, 90 g. of elementary fats, molten at a temperature of 60° C. and containing 1 g. of soyabean lecithin, are incorporated therein. After thorough mixing and kneading, a plastic mass is obtained, which is moulded into cakes or slabs and cooled (to about 10° C.). The hardened cakes are grated with a rotary grater (cheese-grater type) (diameter of the holes: 1–3 mm.).

The gratings thus obtained are enveloped in a powdered mixture having the following composition:

84 g. of skim milk powder
35 g. of NaCl
5 g. of sodium glutamate
20 g. of crystallized sugar
45 mg. of white pepper
175 mg. of citric acid
400 mg. of onion powder The product obtained is a granular powder. It can be dispersed equally well in hot and in cold water.

EXAMPLE II

*Oxtail Soup*

A mixture is prepared from the following powdered ingredients:

45 g. of tomato powder
50 g. of carrot powder
30 g. of turnip powder
5 g. of onion powder
5 g. of leek powder
2.5 g. of parsley powder
200 g. of meat extract bound to potato flour In this mixture are incorporated homogeneously 150 g.

of alimentary fats molten at 60° C. and containing 2 g. of soyabean lecithin and 10 g. of soya sauce. From this mass of cake is formed, which is allowed to cool and grated, after which the gratings thus obtained are mixed with the following mixture:

75 g. of meat extract bound to lactose
   50 g. of skim milk powder
   45 g. of NaCl
   5 g. of sodium glutamate
   200 mg. of pepper
   200 mg. of curry
   75 mg. of garlic powder
   75 mg. of laurel powder
   75 mg. of clove powder A product is obtained in the form of a granular powder, which can be immediately dispersed in a liquid.

EXAMPLE III

*Julienne Soup*

A mixture is prepared, consisting of:

56 g. of potato flour
   12 g. of solubilized starch
   28 g. of mixed vegetables in powdered form
   0.4 g. of soyabean lecithin In this mixture are incorporated 40 g. of alimentary fats, molten at a temperature of about 60° C., then a cake is formed and the latter is cooled and grated over the following mixture:

11 g. of meat extract bound to lactose
   54 g. of skim milk powder
   17 g. of NaCl
   2 g. of sodium glutamate When the gratings have been thoroughly mixed with the powder, a homogeneous granular product is obtained, which forms the complete ready-for-use soup and may be dissolved immediately in a liquid.

As appears from the above stated examples according to the process of the invention it is possible to use constituents which swell very rapidly, such as potato flour, alginates, etc., without forming large agglomerates when coming into contact with a liquid. Because the complete hydration of these constituents is thus attained very rapidly, the boiling period of such products is practically reduced to the duration of the dispersion, so that these products are really ready-for-use products.

What I claim is:

1. A process for the production of a powdered ready-for-use food composition of soluble, insoluble and fatty constituents, which is readily dispersible in a liquid of variable temperature to form an edible product, comprising the steps of melting the fatty constituents, mixing said fatty constituents intimately with all the insoluble constituents to form a substantially homogeneous paste, hardening said paste, forming gratings from said paste, and mixing said gratings with the powdered soluble constituents.

2. A process for the production of ready-for-use soups and sauces in powdered form, from which the ready-for-use dish is obtained by immediate dispersion of the constituents in a liquid of variable temperatures, comprising the steps of melting the fatty constituents, mixing said fatty constituents intimately with all the insoluble constituents to form a substantially homogeneous paste, hardening said paste, forming gratings from said hardened paste, and mixing said gratings with the powdered soluble constituents.

3. A process for the production of ready-for-use soups and sauces in powdered form, from which the ready-for-use dish is obtained by immediate dispersion of the constituents in a liquid of variable temperatures, comprising the steps of melting the fatty constituents, mixing said fatty constituents intimately with all the insoluble constituents to form a substantially homogeneous paste, hardening said paste at a temperature below about 15° C., forming gratings from said hardened paste, and mixing said gratings with the powdered soluble constituents.

4. A process for the production of ready-for-use soups and sauces in powdered form, from which the ready-for-use dish is obtained by immediate dispersion of the constituents in a liquid of variable temperatures, comprising the steps of melting the fatty constituents, mixing said fatty constituents intimately with all the insoluble constituents to form a substantially homogeneous paste, molding said paste to a cake, forming gratings from said cake, and mixing said gratings with the powdered soluble constituents.

5. A process for the production of read-for-usesoups and sauces in powdered form, ffom which the ready-for-use dish is obtained by immediate dispersion of the constituents in a liquid of variable temperatures, comprising the steps of melting the fatty constituents, mixing said fatty constituents intimately with all the insoluble constituents to form a substantially homogeneous paste, molding said paste to a cake before said fatty constituents have hardened, forming gratings from said cake, and mixing said gratings with the powdered soluble constituents.

6. A process for the production of ready-for-use soups and sauces in powdered form, from which the ready-for-use dish is obtained by immediate dispersion of the constituents in a liquid of variable temperatures, comprising the steps of melting the fatty constituents, mixing said fatty constituents intimately with all the insoluble constituents to form a substantially homogeneous paste, molding said paste to a cake in a press before said fatty constituents have hardened, forming gratings of from about 1 to 3 mm. in diameter from said cake, and mixing said gratings with the powdered soluble constituents.

7. A food composition in powdered form readily dispersable in a liquid to form an edible product comprising soluble constituents, insoluble constituents, and fatty constituents, wherein the insoluble constituents and fatty constituents are in the form of gratings, consisting of a continuous fatty phase having the insoluble constituents dispersed therein.

8. Ready-for-use soups and sauces being a blend of powdered soluble components and gratings, consisting of a continuous fatty phase with the swellable components dispersed therein.

9. Ready-for-use soups and sauces being a blend of powdered soluble components and gratings, said gratings having the diameter from about 1 to 3 mm. and consisting of a continuous fatty phase with the swellable components dispersed therein.

References Cited in the file of this patent

UNITED STATES PATENTS

| 2,168,360 | Musher | Aug. 8, 1939 |
| 2,641,547 | Evans | June 9, 1953 |

UNITED STATES PATENT OFFICE
CERTIFICATE OF CORRECTION

Patent No. 3,116,151  December 31, 1963

Claude Robert Giddey

It is hereby certified that error appears in the above numbered patent requiring correction and that the said Letters Patent should read as corrected below.

Column 1, line 20, for "species" read -- spices --; column 2, line 40, for "elementary" read -- alimentary --; column 4, line 25, for "ffom" read -- from --.

Signed and sealed this 2nd day of June 1964.

(SEAL)
Attest:

ERNEST W. SWIDER
Attesting Officer

EDWARD J. BRENNER
Commissioner of Patents